United States Patent [19]
Kramer et al.

[11] 4,052,654
[45] Oct. 4, 1977

[54] GYRO STABILIZED INERTIAL REFERENCE SYSTEM WITH GIMBAL LOCK PREVENTION MEANS

[75] Inventors: Manuel Kramer, Mountain-View, Calif.; Douglas J. Dapprich, Watertown, Mass.

[73] Assignee: The Charles Stark Draper Laboratory, Inc., Cambridge, Mass.

[21] Appl. No.: 615,589

[22] Filed: Sept. 22, 1975

[51] Int. Cl.$^2$ ............................................. B64C 17/06
[52] U.S. Cl. ...................................... 318/649; 244/79; 74/5.2; 244/165
[58] Field of Search ............... 318/649, 648, 661, 652; 244/79, 165; 74/5.2, 5.22, 5.34, 5.4

[56] References Cited
U.S. PATENT DOCUMENTS

| | | | |
|---|---|---|---|
| 3,188,870 | 6/1965 | Lerman | 74/5.2 |
| 3,269,024 | 8/1966 | Fischer et al. | 74/5.34 |
| 3,616,699 | 11/1971 | Brand | 74/5.2 |
| 3,875,488 | 4/1975 | Crocker et al. | 318/648 |

*Primary Examiner*—Gene Z. Rubinson
*Assistant Examiner*—Michael Mutter
*Attorney, Agent, or Firm*—Kenway & Jenney

[57] ABSTRACT

A four-axis gyro stabilized inertial reference system. The system comprises a nested gimbal configuration, which includes a platform and three successively larger and concentrically disposed inner, middle and outer gimbals and an outer casing. The platform and inner, middle and outer gimbals are each configured to permit rotation about an associated axis with that axis being perpendicular to the corresponding axis of the neighboring gimbal or platform. The system further includes a platform stabilizing means for maintaining the platform in a substantially fixed spatial orientation, independent of the spatial orientation of the outer casing and over a predetermined range of angular rates. The stabilizing means includes a detection means for detecting the spatial orientation of the platform, the gimbals and the outer casing, and an angular displacement means responsive to that detection means to appropriately displace one or more of those elements in a manner to maintain the platform in a substantially fixed spatial orientation. The displacement means drives one or more of the platform, inner gimbal and either the middle or outer gimbal about their respective axes, with the selection of the particular one of the middle and outer gimbals to be displaced and the driving signal therefor being dependent upon the current orientation of the inner and middle gimbals in accordance with a predetermined set of criteria.

12 Claims, 9 Drawing Figures

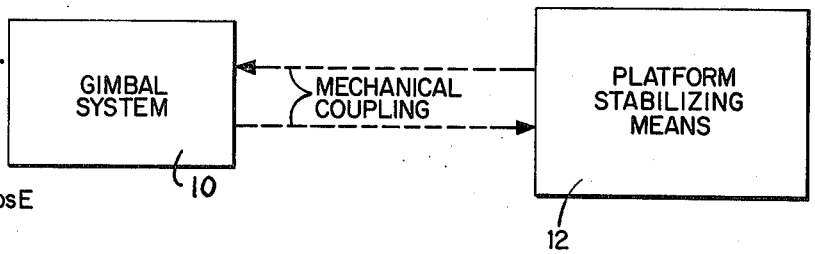
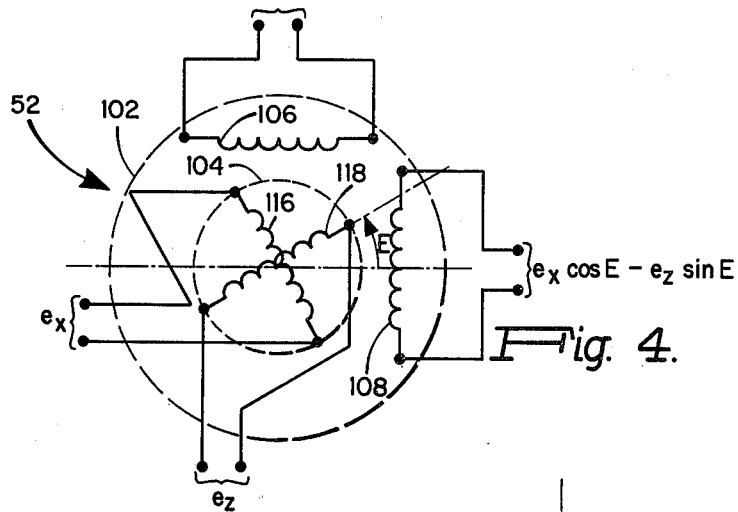
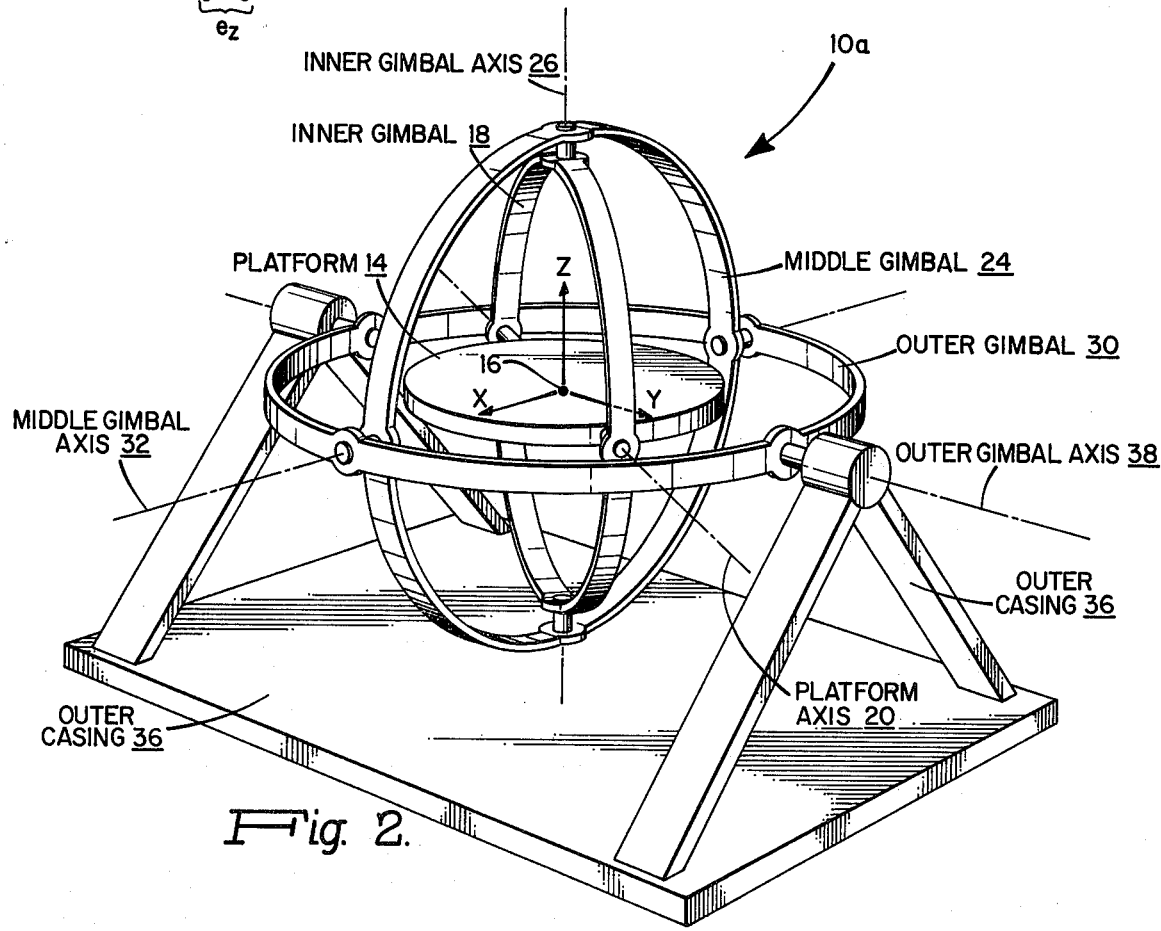

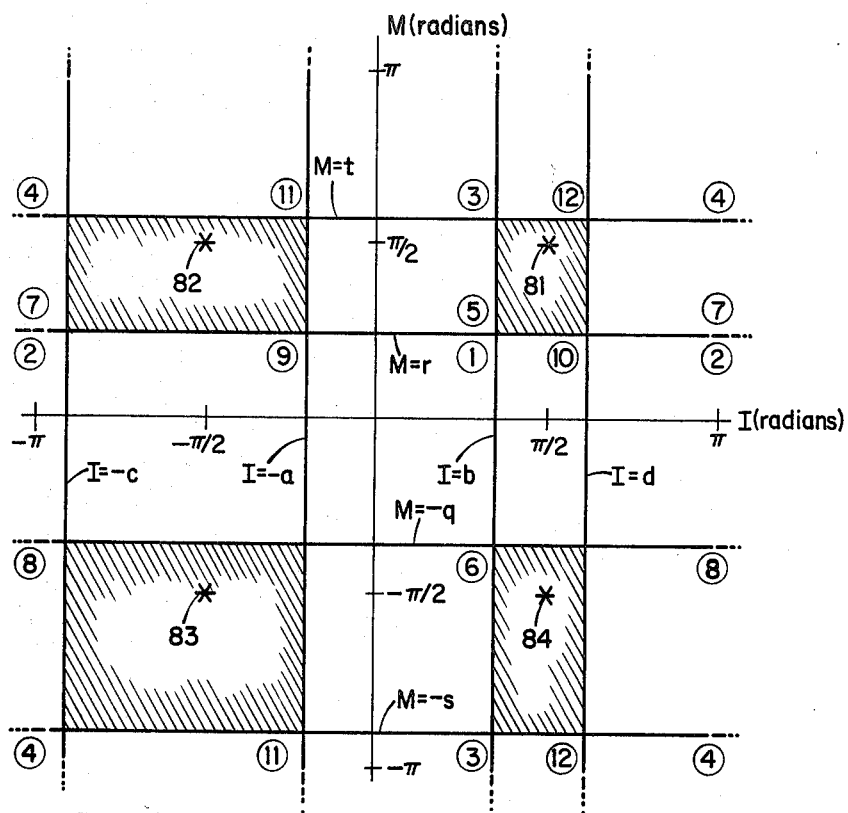
Fig. 6.
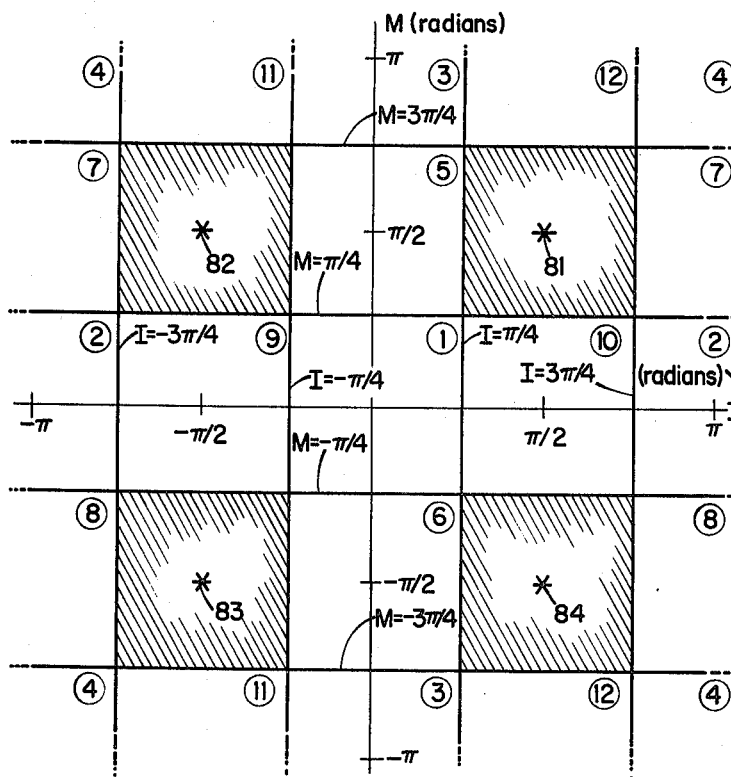
Fig. 7.
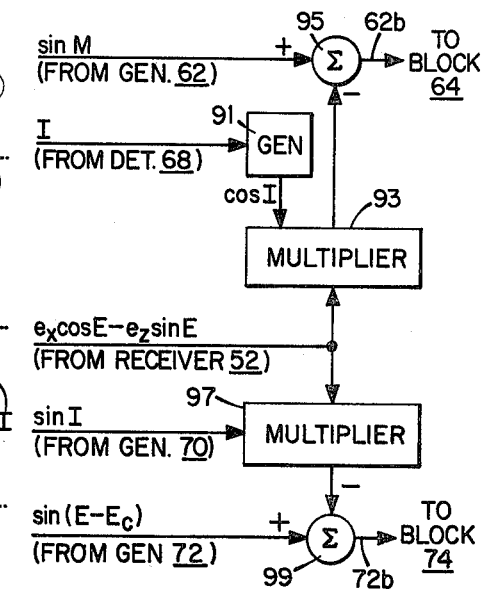
Fig. 8.
Fig. 9.

GYRO STABILIZED INERTIAL REFERENCE SYSTEM WITH GIMBAL LOCK PREVENTION MEANS

BACKGROUND OF THE INVENTION

This invention relates to inertial guidance systems and more particularly, to systems for maintaining an inertial platform in a substantially fixed spatial orientation.

Inertial guidance systems for vehicles with unlimited angular freedom (e.g. airborne or spaceborne vehicles) require an inertial reference upon which the orientation control mechanization is based. Such a reference is generally provided by a platform which is maintained in a relatively stable spatial orientation, irrespective of the vehicle motion. A system for maintaining the platform in that stable orientation over a predetermined range of vehicle motions may take the form of a nested configuration of a platform with two or more successively larger and concentrically disposed gimbals and associated driving means and control circuitry. However, there are certain relative platform and gimbal orientations which must be avoided in order to maintain the platform stabilization system in an operative state.

When the platform and gimbals are in the orientation-to-be-avoided, the system is said to be in "gimbal lock". The gimbal lock state is defined as being the state in which the axes of rotation of all the gimbals and the platform lie in a single plane. In this situation, it is impossible for the platform stabilization system to maintain the platform in its substantially fixed orientation when the vehicle has an angular velocity with a component perpendicular to the plane of the rotation axes.

A three axis gyro stabilized inertial reference system (having a nested configuration of a platform and two gimbals) provides for the three degrees of freedom required by the generalized motion of a vehicle. If the vehicle motion is restricted to avoid gimbal lock, then such a three axis system is adequate to provide an inertial reference for a navigation or a guidance control system. However, in a nested three axis system, gimbal lock occurs whenever the outermost axis of rotation (fixed to the vehicle) becomes parallel to the innermost axis of rotation (fixed to the platform). Thus, three axis systems are subject to inherent constraints on the vehicle orientation in order to avoid the gimbal lock state.

To eliminate such restrictions of vehicle motion while at the same time avoiding the possibility of gimbal lock, platform stabilization systems having a platform and three or more gimbals (with associated rotational axes) may be utilized with platform and gimbal motion only three of the axes being controlled at any one time to maintain the platform stable, while the remaining axis (or axes) are redundant. That is, the relative orientation of three of the rotatable elements (the platform and the gimbals) are continuously adjusted to maintain the platform in a substantially fixed spatial orientation as though the system included only the platform and two gimbals (as in a three axis system), while the relative orientation of the remaining gimbal (or gimbals) is adjusted to prevent the alignment of all gimbal axes in the same plane. Thus, in a four or more axis system, gimbal lock may be avoided while permitting the vehicle to have unrestricted angular orientation through the appropriate assignment and control of selected ones of the gimbals about their associated rotational axis to be utilized in a stabilization control loop.

The classical techniques for embodying a redundant gimbal system utilize the platform and innermost gimbal and select one of the two outermost gimbals to be in the stabilization loop while the non-selected one of the two outermost gimbals is constantly driven to keep that redundant gimbal near its null position.

Four axis systems of this type are well known in the art. See, for example, Macomber and Fernandex, Inertial Guidance Engineering, Prentice-Hall, Englewood Cliffs, N.J., 1962, Chapter 3. However, as noted by Macomber and Fernandez, such systems are subject to the disadvantage that, during certain vehicles maneuvers, the angular velocity of certain of the gimbals is required to be infinite for perfect stabilization of the platform. Furthermore, this infinite angular velocity requirement is not a singular occurrence, but occurs at a plurality of points. Of course, in practical embodiments, the platform is less than perfectly stabilized, but relatively large and rapid changes in angular position of certain of the gimbals, or "gimbal flip", are still required to maintain acceptable levels of platform stabilization.

As a result of the inability of realizable systems to achieve the infinite acceleration required for perfect stabilization, all systems represent trade-offs in performance. For example, redundant gimbal flips are required in prior art systems to be as great as 180° during certain vehicle maneuvers accommodating a predetermined range of vehicle angular rates while at the same time maintaining the platform at an "acceptable" level of stability. In order to achieve the relatively large flips in the required short intervals necessary to meet the stability requirements, substantially high torque and consequently, high power mechanizations may be required to drive the gimbals. Of course, in airborne and spaceborne vehicles, both element size of all components and power requirements are desired to be minimized.

On the other hand, the same level of platform stability may be attained in alternative prior systems with smaller, lighter torque mechanizations provided the permitted range of vehicle angular rates is correspondingly reduced. Of course, the permitted range of angular rates may be traded-off with component power requirements to any desirable degree. Thus, the prior art systems encounter relatively severe restrictions in component size and power and permitted range of vehicle angular rates for a predetermined level of platform stabilization.

Accordingly, it is an object of the present invention to provide a four axis gyro stabilized inertial reference system for maintaining an inertial platform in a substantially fixed spatial orientation while minimizing the magnitude of required gimbal flips.

A further object is to provide a system utilizing a four axis gyro stabilized platform and control system for maintaining a platform in a substantially fixed spatial orientation while limiting the magnitude of redundant gimbal flips to be approximately 45° or less during any permitted vehicle maneuver.

A still further object is to provide a four axis gyro stabilized inertial reference system including a control system for selecting the stabilization axes in response to the detected relative inner and middle gimbal angles in the system.

Still another object is to provide a system for maintaining an inertial platform in a substantially fixed spatial orientation requiring relatively small torque and power mechanizations for gimbal motion for a predetermined range of permitted vehicle angular rates.

Another object is to provide a system for maintaining an inertial platform in a substantially fixed spatial orientation while permitting relatively large ranges of vehicle angular rates for predetermined torque and power mechanizations.

SUMMARY OF THE INVENTION

A four axis gyro stabilized inertial reference system according to the present invention comprises a nested configuration having concentric and successively larger elements, respectively including: a platform, an inner gimbal, a middle gimbal, an outer gimbal and an outer casing (which may be mechanically coupled to the vehicle to be controlled by an associated navigation or guidance system). The inertial reference system further includes a means for controlling the various gimbal orientations relative to each other in a manner maintaining the platform in a substantially fixed spatial orientation, the platform orientation being independent of the spatial orientation and motion of the outer casing.

The platform and each of the inner, middle and outer gimbals have associated control means which is responsive to signals generated by one or more gyros. The gyro signals are representative of angular displacements of the platform. The control means maintain a selected stabilization loop mechanization for the platform and gimbals for predetermined ranges of orientation of the inner and middle gimbals. In addition, for predetermined stabilization loop mechanizations, the signal for controlling the outer gimbal is generated in accordance with a predetermined strategy so that requirement for nulling a large error signal is eliminated.

As a consequence of the configuration of the present invention, the reference vehicle may be moved to an unlimited angular orientation and to an extended range of angular velocities (for a given torquer mechanization) compared to prior art systems, while the control means maintain the platform to be in a substantially fixed spatial orientation, avoiding the gimbal lock condition while simultaneously requiring redundant gimbal flips to be approximately 45° or less. The control means establishes an optimum stabilization loop mechanization for predetermined ranges (or zones) of the orientation of the inner and middle gimbals, and switches between the various stabilization loop mechanizations depending upon the current position of the inner and middle gimbal orientation.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 1 shows, a four axis gyro stabilized inertial reference system in accordance with the present invention;

FIG. 2 shows an exemplary nested gimbal and platform configuration for the system of FIG. 1;

FIG. 4 shows in schematic form an angle resolver for the stabilizing means of FIG. 3;

FIGS. 6 and 7 show two dimensional maps of the zones for the inner and middle gimbal angles for the configuration of FIG. 2;

FIG. 8 shows in tabular form the control signals applied to the middle and outer axis control circuits and motors as a function of inner and middle gimbal angles for the system of FIGS. 1-3; and FIG. 9 shows in block diagram form, an alternative configuration for portions of the platform stabilizing means of FIG. 3.

DESCRIPTION OF THE PREFERRED EMBODIMENT

Figure 3:
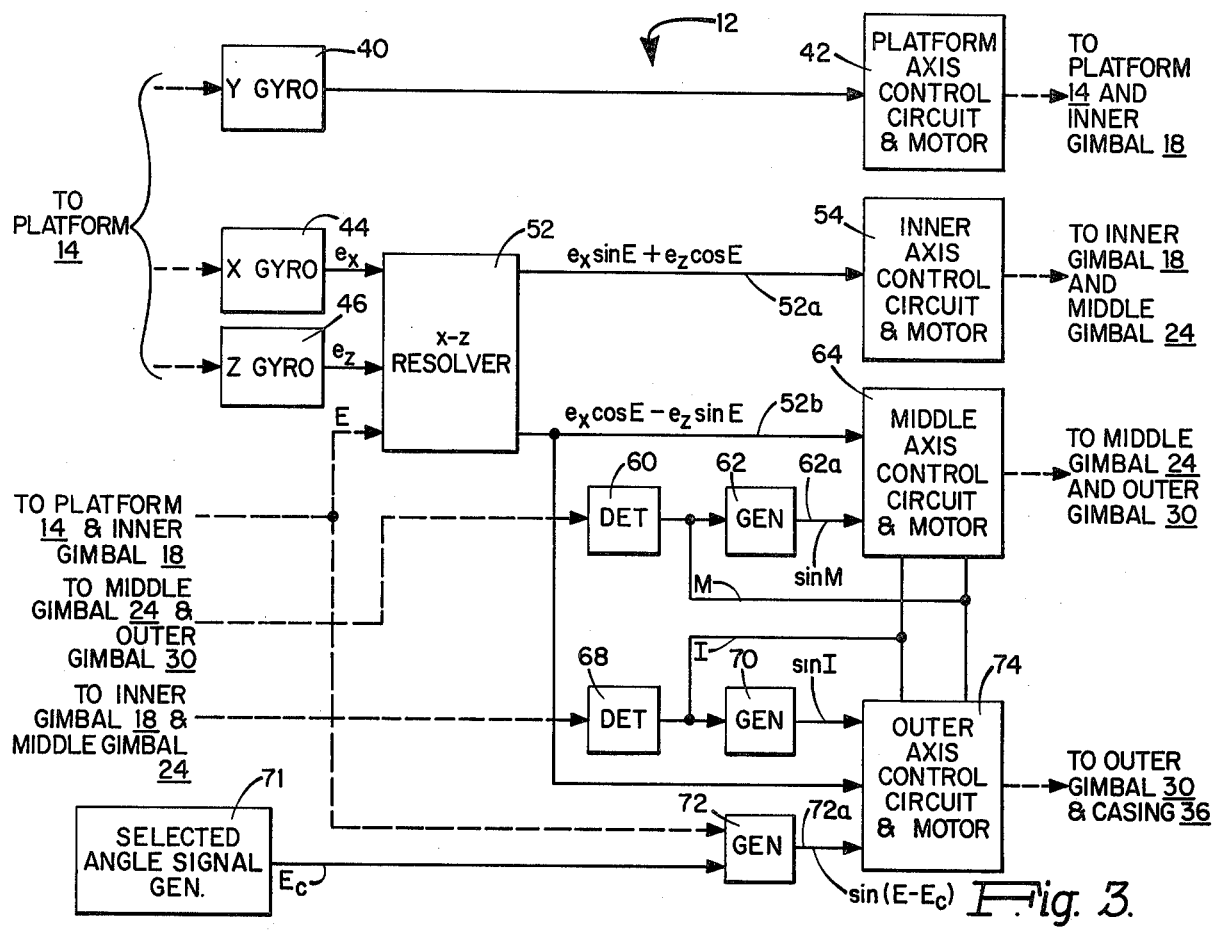
FIG. 3 shows in block diagram form the platform stabilizing means for the system of FIG. 1.

A four axis gyro stabilized inertial reference system in accordance with the present invention is shown in FIG. 1. In that figure, a nested gimbal system 10 is shown with indicated mechanical coupling to a platform stabilizing means 12. It will be understood that the gimbal system 10 may be one of many forms known in the art, which include a nested configuration of a platform and three successively larger and concentrically disposed gimbals. Such gimbals may be in the form known as "ring" gimbals or, as a further example, may be in the form of spherical shells.

FIG. 2 shows an exemplary nested gimbal configuration 10a suitable for use in the system of FIG. 1. The gimbal system 10a includes a platform 14 and three successively larger ring gimbals 18, 24 and 30. The platform 14 is shown with a reference point 16 disposed thereon. A cartesian coordinate system having a fixed spatial orientation includes X, Y and Z axes having their common intersection point at the reference point 16. The system 10a further includes the inner gimbal 18 which is larger than and disposed about platform 14. Gimbal 18 is rotationally coupled to platform 14 about a platform axis 20. The middle gimbal 24 is concentric with inner gimbal 18 and is rotationally coupled to inner gimbal 18 about an inner gimbal axis 26 which is perpendicular to the platform axis 20. The outer gimbal 30 is concentric with the gimbals 18 and 24 and is rotationally coupled to middle gimbal 24 about a middle gimbal axis 32 which is perpendicular to the inner gimbal axis 26. An outer casing 36 is shown in FIG. 2 to include a base portion and two end supporting portions which are rotationally coupled to the outer gimbal 30 about an outer gimbal axis 38 which is perpendicular to the middle axis 32. It will be understood that although the gimbal shown in FIG. 2 is diagramatically shown having ring-like gimbals, and an outer casing having a base and two supporting members, alternative forms such as spherical shell configurations may be utilized in other embodiments.

Furthermore, in the particular embodiment illustrated in FIG. 2, axes 20, 26, 32 and 38 are shown to intersect at the reference point 16, although this characteristic is not a requirement for the present invention. Accordingly, in other embodiments, those axes may not have a common intersection point.

FIG. 3 shows in block diagram form an exemplary embodiment for the platform stabilizing means 12 of the system in FIG. 1. In FIG. 3, the solid arrows denote electrical coupling between the various blocks and the broken arrows denote mechanical coupling as indicated. The stabilizing means 12 comprises a platform axis control means which includes Y-gyro 40 and a platform axis motor and associated control circuit 42. The Y-gyro 40 in the present embodiment is a single degree of freedom integrating gyroscope such as that described in U.S. Pat. No. 2,752,790. Y-gyro 40 is mechanically coupled to the platform 14 with its sensitive axis parallel to the Y-axis. Gyro 40 detects the angular displacement of that platform about the Y-axis and further generates an associated J-error signal proportional to that displacement. The J-error signal is applied in turn to the control circuit and motor 42. The motor 42 is mechanically coupled to platform 14 and inner gimbal 18 so that in response to the J-error signal, the motor 14 displaces the platform 14 with respect to the inner gimbal 18. The control circuit portion of block 42 controls the motor portion to null the J-error signal. Thus, the platform axis control means provides a stabilization loop for the platform 14 motion about the Y-axis. Such stabilization loops are well-known in the art. For example, see U.S. Pat. No. 3,104,545 to C.S. Draper, et al.

The platform stabilizing means 12 further includes an inner axis control means which includes X-gyro 44, Z-gyro 46, X-Z resolver 52 and an inner axis motor and associated control circuit 54. The X-gyro 44 and Z-gyro 46 are mechanically coupled to platform 14 and are substantially similar to Y-gyro 40, but are orthogonally configured such that the three gyros 40, 44 and 46 are sensitive to angular displacements of the platform about Y, X and Z axes, respectively.

The X-gyro 44 includes a means for generating an associated X error signal $e_x$, proportional to the angular displacement of platform 14 about the X axis. The Z-gyro 46 produces a Z error signal, $e_z$, proportional to the angular displacement of platform 14 about the Z axis.

As described, the present embodiment utilizes a set of gyros (i.e. gyros 40, 44 and 46) which are orthogonally configured with the further constraint that the X, Y and Z gyro sensitive axes are parallel to the X, Y and Z axes, respectively. Alternatively, embodiments of the present invention may utilize gyros configured in a manner requiring suitable means for resolving the angular displacement signal from all three gyros into X, Y and A axis components, e.g. if none of the X, Y and Z gyros have a sensitive axis parallel to one of the X, Y and Z axes. For the present embodiment, no such resolving means is required for gyros 40, 44 and 46. The exemplary X—Z resolver 52 of the inner axis control means is shown schematically in FIG. 4. Such resolvers are well known in the art, for example, see U.S. Pat. No. 2,752,793. Resolver 52 includes a stator 102 and rotor 104, each having a pair of windings wound in quadrature (windings 106, 108, and 116, 118, respectively). The stator 102 and rotor 104 are mechanically coupled to platform 14 and gimbal 18 so that the position of rotor 104 relative to stator 102 is directly related to the elevation angle E between the platform 14 and gimbal 18. The terminals of winding 116 are connected to X-gyro 44 so that the signal $e_x$ is applied across that winding. Similarly, the terminals of winding 118 are connected to Z-gyro 46 so that the signal $e_z$ is applied across that winding.

The angular error resolver 52 is responsive to the X and Z error signals and to the elevation angle E (between the stator 102 and rotor 104) to generate a V error signal on lines 52a (across winding 106) proportional to $$e_x \sin E + e_z \cos E$$

The motor portion of block 54 is mechanically coupled to the inner gimbal 18 and the middle gimbal 24 so that when energized, the motor displaces the inner gimbal 18 with respect to the middle gimbal 24 about the inner gimbal axis 26. The control circuit portion of block 54 is responsive to the V error signal to energize the motor in a manner nulling the V error signal. Thus, the inner gimbal stabilization loop is responsive to the angular displacement of platform 14 about the X and Z axes and the relative angular displacement of platform 14 with respect to inner gimbal 18.

The platform stabilization means 12 further comprises a middle axis control means. The middle axis control means includes X-gyro 44, Z-gyro 46, X—Z angular error resolver 52, a detector 60 and associated 62 and a middle axis motor and associated control circuit 64. The detector 60 is mechanically coupled to the middle gimbal 24 and outer gimbal 30 and provides an output signal M which is proportional to the angular displacement of the outer gimbal 30 with respect to the middle gimbal 24. The associated generator 62 provides a control signal proportional to sin M. The resolver 52 is responsive to the X and Z error signals and to the elevation angle, E (between stator 102 and rotor 104), to provide a resolved control signal on line 52b (across winding 108) proportional to:

$$e_x \cos E - e_z \sin E$$

This latter signal and the control signal from generator 62 are both applied to the control circuit in block 64 via lines 62a and 52b, respectively.

The motor in block 64 is mechanically coupled to middle gimbal 24 and outer gimbal 30, so that when energized, the middle gimbal 24 is displaced with respect to the outer gimbal 30 about the middle gimbal axis 32. The control circuit portion of block 64 of the middle gimbal stabilization loop is responsive to M (the angular displacement of the middle gimbal 24 with respect to the outer gimbal 30) and to I (the displacement of the inner gimbal 18 with respect to the middle gimbal 24) in a manner described more fully below in conjunction with FIGS. 5–7.

As set forth in detail below, at certain times depending upon the current values of I and M, the control circuit portion of block 64 of the middle gimbal stabilization loop is responsive to the output control signal from resolver 52 (line 52b) to drive its associated motor until that output signal is nulled. At other times, depending on I and M, the control circuit of block 64 is responsive to the output control signal from generator 62 (line 62a) to drive the associated motor so that the generator 62 output control signal is nulled.

The platform stabilizing means 12 further comprises an outer axis control means. The outer axis control means includes X-gyro 44, Z-gyro 46, X—Z angular error resolver 52, detector 68 and associated 70, selected angle signal generator 71, generator 72 and an outer axis motor and associated control circuit 74. The detector 68 is mechanically coupled to the inner gimbal 18 and middle gimbal 24 and generates a signal I representative of the angular displacement of inner gimbal 18 with respect to the middle gimbal 24. The generator 70 produces an output signal proportional to sin I, which signal is applied to a first input of block 74. The generator 72 is responsive to the angular displacement of gimbal 18 from platform 14 and to a selected angle signal $E_c$ applied from generator 71 to provide an output signal sin $(E - E_c)$ to a second input of block 74. Generator 71 is described further below in conjunction with the Table in FIG. 8.

The output signal from resolver 52 is applied to a third input of block 74. The motor portion of block 74 is mechanically coupled to the outer gimbal 30 and casing 36 so that when the motor is energized, the outer gimbal 30 is rotationally displaced with respect to casing 36 about the outer gimbal axis 38. As described more fully below in conjunction with FIGS. 5-7, the control circuit of block 74 of the outer gimbal stabilization loop is responsive to M (the angular displacement of the middle gimbal 24 and outer gimbal 30) and to I (the angular displacement of the inner gimbal 18 with respect to the middle gimbal 24) so that depending on the particular values of these displacements at any given time, one of the three applied control signals (i.e. from generator 70, generator 72 or resolver 52) are utilized to drive the motor of block 74 in a manner to null the associated driving signal.

It will be understood that with the exception of the switching circuit portion of the control circuits of blocks 64 and 74, which select the appropriate one of the control signals to drive the associated motors, all blocks shown in FIG. 3 are implemented by electromechanical and electronic circuit techniques which are well-known in the art. Those switching circuit portions of blocks 64 and 74 are also implemented by well-known techniques in accordance with the switching constraints described below in conjunction with FIGS. 6 and 7.

Figure 5:
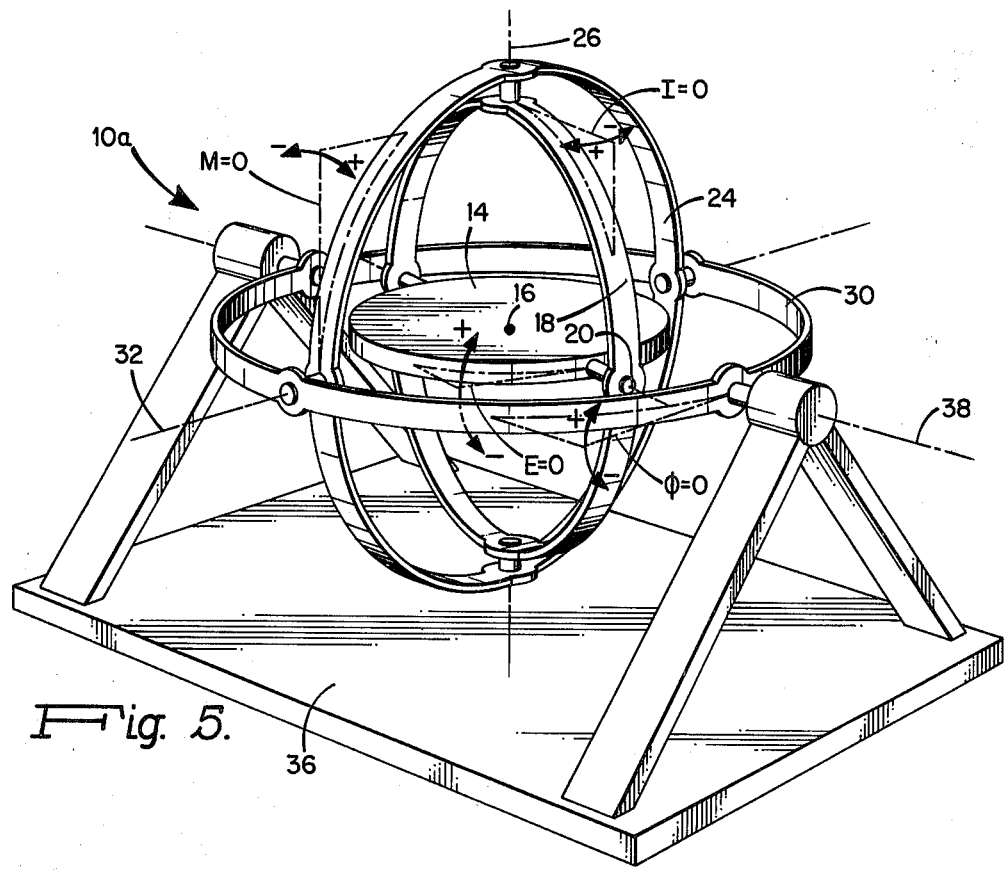
FIG. 5 shows a reference orientation of the nested gimbal and platform configuration of FIG. 2.

FIG. 5 shows the gyro system 10a of FIG. 2 in the hereinafter defined "reference" orientation with the platform axis 20 aligned with the outer gimbal axis 38 and the inner gimbal axis 26 being perpendicular to each of axes 20 and 38. As shown in FIG. 5, the angle formed between the planes of middle gimbal 24 and outer gimbal 30, M is defined as zero when axes 26 and 38 are perpendicular. Similarly, the angle I between the planes of inner gimbal 18 and middle gimbal 24 is defined to be zero when axes 20 and 32 are perpendicular. Similarly, the elevation angle E of the platform 14 is defined to be zero when the top surface of the platform 14 (in this exemplary embodiment) is perpendicular to the axis 26. In a similar manner, the angle $\phi$ formed by the outer gimbal 30 with respect to the casing 36 is defined to be zero when axis 32 is parallel to the base portion of casing 36 (in the particular embodiment shown in FIGS. 1-5). FIG. 5 also indicates the signs of changes in angles E, I, M and $\phi$ from the reference orientation. It will be understood that the angle definitions and their associated signs and the initial reference position as shown in FIG. 5 are selected for the present description of this embodiment. In other embodiments, alternative definitions may be utilized.

As defined above, the gimbal system 10a is in its gimbal lock state when angles I and M are both odd multiples of $\pi/2$ radians. That is to say, under conditions when both I and M are multiples of 90°, axes 20, 26, 32 and 38 are coplanar.

FIG. 6 shows a two dimensional I-M zone map of the possible combinations of angles M and I where both M and I lie in the range $-\pi$ to $+\pi$ radians. In the map of FIG. 6, the gimbal lock points (i.e. where M and I are both odd multiples of $\pi/2$ radians) are denoted by the asterisks 81-84. Each of lock points 81-84 is surrounded by a region or zone (shown in shaded form in FIG. 6) extending a predetermined distance in each of the I and M directions from the respective lock points. When the current locus of the operating point (I, M) lies within any of these shaded zones associated with gimbal lock points 81-84, the platform stabilizing means 12 of the present embodiment drives the gimbals of system 10a in an appropriate manner so that the current locus of operating point (I, M) approaches one of the non-shaded zones.

As noted above in conjunction with FIG. 3, the control circuits associated with the platform axis motor and the inner axis motor are at all times responsive to the J and V error signals, respectively. However, the control circuits associated with the middle axis motor and the outer axis motor are responsive to the current I and M values of the gimbal system 10a to select one of the two applied control signals for the middle axis block 64, and one of the three applied control signals for the outer axis block 74. The selected one of each group of middle and outer axis control signals is applied with an appropriate sign to the associated motors of blocks 64 and 74. In response thereto, the control mechanization of the gimbal system is re-configured to null the selected signals. The manner in which these control signals are selected is set forth in FIG. 8.

In addition to the shaded zones surrounding gimbal lock points 81-84, FIG. 6 shows 12 zones which are delineated by heavy solid lines and identified by encircled reference numerals 1-12. It will be understood these zones repetitively occur as angles M and I increase, so that the zones may be defined in the following manner:

| | |
|---|---|
| Zone (1): | $[-a + 2\pi m] < I < [+b + 2\pi m]$ radians<br>$[-q + 2\pi n] < M < [+r + 2\pi n]$ radians |
| Zone (2): | $[d + 2\pi m] < I < [-c + 2\pi(m + 1)]$ radians<br>$[-q + 2\pi n] < M < [+r + 2\pi n]$ radians |
| Zone (3): | $[-a + 2\pi m] < I < [+b + 2\pi m]$ radians<br>$[+t + 2\pi n] < M < [-s + 2\pi(n + 1)]$ radians |
| Zone (4): | $[+d + 2\pi m] < I < [-c + 2\pi(m + 1)]$ radians<br>$[+t + 2\pi n] < M < [-s + 2\pi(n + 1)]$ radians |
| Zone (5): | $[-a + 2\pi m] < I < [+b + 2\pi m]$ radians<br>$[+r + 2\pi n] < M < [+t + 2\pi n]$ radians |
| Zone (6): | $[-a + 2\pi m] < I < [+b + 2\pi m]$ radians<br>$[-s + 2\pi n] < M < [-q + 2\pi n]$ radians |
| Zone (7): | $[+d + 2\pi m] < I < [-c + 2\pi(m + 1)]$ radians<br>$[+r + 2\pi n] < M < [+t + 2\pi n]$ radians |
| Zone (8): | $[+d + 2\pi m] < I < [-c + 2\pi(m + 1)]$ radians<br>$[-s + 2\pi n] < M < [-q + 2\pi n]$ radians |
| Zone (9): | $[-c + 2\pi m] < I < [-a + 2\pi m]$ radians<br>$[-q + 2\pi n] < M < [+r + 2\pi n]$ radians |
| Zone (10): | $[+b + 2\pi m] < I < [+d + 2\pi m]$ radians<br>$[-q + 2\pi n] < M < [+r + 2\pi n]$ radians |
| Zone (11): | $[-c + 2\pi m] < I < [-a + 2\pi m]$ radians<br>$[+t + 2\pi n] < M < [-s + 2\pi(n + 1)]$ radians |
| Zone (12): | $[+b + 2\pi m] < I < [+d + 2\pi m]$ radians<br>$[+t + 2\pi n] < M < [-s + 2\pi(n + 1)]$ radians | where $m$ and $n$ are integers, i.e. members of the set $\{0, \pm 1, \pm 2, \ldots\}$, and where $a$, $b$, $q$ and $r$ are greater than or equal to zero and less than $\pi/2$ radians, and $c$, $d$, $s$ and $t$ are greater than $\pi/2$ radians and less than or equal to $\pi$ radians.

FIG. 7 illustrates an I-M zone map similar to that in FIG. 6 when $a=b=r=q=\pi/4$ radians and where $c=d=s=t=3\pi/4$ radians. It will be understood that in alternative embodiments, each of parameters $a$, $b$, $q$, and $r$ may be independently set to any value greater than or equal to zero and less than $\pi/2$ radians, and $c$, $d$, $s$ and $t$ may be independently set to any value greater than $\pi/2$ radians and less than or equal to $\pi$ radians. In some embodiments, points between adjacent zones may be specifically defined to lie in one of the two zones, e.g. according to the rule: a point nominally between two adjacent zones belongs to the zone identified with the lower reference numeral.

The coordinate pair (I, M) is used to identify the current zone of the gimbal system 10a in terms of the zones (1) – (12). FIG. 8 shows a table which sets forth the control signals which are applied to blocks 64 and 74, respectively, as a function of the current zone of the gimbal system 10a. In the table of FIG. 8, it will be understood that in each zone, a "plus" sign indicates that a signal proportional to the indicated control signal with a positive constant of proportionality is applied to the associated control circuits. A "minus" sign for a zone indicates that the corresponding control signal having a negative constant of proportionality is applied to the associated control circuit. No marking for a zone in the table indicates that the corresponding control signal is not used while gimbal system 10a is in that zone. For example, in zone (1), the middle axis control signal $e_x \cos E - e_z \sin E$ is applied with a positive proportionality constant to the block 64 of FIG. 3 and the signal $\sin (E - E_c)$ with a positive constant of proportionality is applied to the outer axis control circuit and motor 74. When gimbal system 10a is in zone (1), the remaining control signals, (i.e. sin M and sin I) are not utilized.

Accordingly, the control circuits associated with blocks 64 and 74 as shown in FIG. 3 are responsive to the signals generated by detectors 60 and 68 (i.e. signals M and I, respectively) to determine which zone the gimbal system 10a is currently in and then to switch and apply the appropriate control signal to the middle axis and outer axis blocks 64 and 74, respectively, in accordance with the table set forth in FIG. 8.

The generator 71 provides the signal $E_c$ wherein that signal equals a constant whenever the locus of the point (I, M) is in one of zones (1) – (4). The value of the constant equals the value of the signal E immediately before the locus of point (I, M) entered the one of zones (1) – (4). As noted above in conjunction with the table in FIG. 8, when (I, M) is in zones (1) – (4), the outer gimbal is redundant and the control signal $\sin (E - E_c)$ is utilized to null that gimbal.

In an alternative configuration, the control signals applied to blocks 64 and 74 via lines 62a and 72a may be replaced by control signals having second order effect corrections. These modified control signals are proportional to:

line 62a: $\sin (E - E_c) - K_1 (e_z \cos E - e_x \sin E) \sin I$
line 72a: $\sin M - K_2 (e_x \cos E - e_z \sin E) \cos I$ where $K_1$ and $K_2$ are predetermined constants. The $K_1$ and $K_2$ factors provide degenerative signals limits on redundant loop acceleration and thereby enhance the system synchronization characteristics. The values for $K_1$ and $K_2$ for a particular system may be determined using conventional techniques.

A configuration for generating these latter two control signals is shown in FIG. 9, wherein the respective signals are applied via lines 62b and 72b to the blocks 64 and 74, respectively, in lieu of the signals on lines 62a and 72a. It will be understood that these modified control signals are switched by the control circuits associated with blocks 64 and 74 in the same manner as the former signals which were applied via lines 62a and 72a (i.e. in accordance with the table shown in FIG. 8). As noted in FIG. 9, the control signal for block 64 is generated from the signals produced by generator 62, detector 68 and resolver 52 in conjunction with generator 91, multiplier 93 and summing network 95. In a similar manner, the multiplier 97 and summing network 99 combine the signals generated by resolver 52, generator 70 and generator 72 to produce the control signal for application to block 74.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A four axis gyro-stabilized inertial reference system comprising:
   A. a platform having an associated cartesian coordinate system with a fixed spatial orientation, said coordinate system including X, Y and Z axes,
   B. an inner gimbal, said inner gimbal being larger than and disposed about said platform and further being rotationally coupled to said platform about a platform axis,
   C. a middle gimbal, said middle gimbal being larger than and disposed about said inner gimbal and further being rotationally coupled to said inner gimbal about an inner gimbal axis, said inner gimbal axis being perpendicular to said platform axis,
   D. an outer gimbal, said outer gimbal being larger than and disposed about said middle gimbal and further being rotationally coupled to said middle gimbal about a middle gimbal axis, said middle gimbal axis being perpendicular to said inner gimbal axis,
   E. an outer casing, said outer casing being larger than and disposed about said outer gimbal and further being rotationally coupled to said outer gimbal about an outer gimbal axis, said outer gimbal axis being perpendicular to said middle gimbal axis,
   F. a platform stabilizing means for maintaining said platform in a fixed spatial orientation, wherein said stabilizing means comprises:
      i. a platform axis control means including:
         a. a Y-gyro having a first detection means for detecting angular displacement of said platform about said Y-axis, and means for generating an associated J error signal proportional thereto,
         b. a platform axis motor and associated control circuit responsive to said J-error signal to displace said platform about said platform axis so as to null said J-error signal,
      ii. an inner axis control means including:
         a. an X-gyro having a second detection means for detecting the angular displacement of said platform about said X-axis, and means for generating an associated X-error signal $e_x$ proportional thereto,
         b. a Z-gyro having a third detection means for detecting the angular displacement of said platform about said Z axis, and means for generating a Z-error signal $e_z$ proportional thereto,
         c. an x-z angular error resolver, said first resolver being responsive to said X and Z-error signals to the angular displacement, E, of said inner gimbal about said platform axis, to generate a V-error signal proportional to:

$e_x \sin E + e_z \cos E$ d. an inner axis motor and associated control circuit responsive to said V-error signal to displace said inner gimbal about said inner gimbal axis so as to null said V-error signal,
      iii. a middle axis control means including:

a. said X-gyro and Z-gyro,
b. said x-z angular error resolver, said resolver being further responsive to said X and Z-error signals and to the angular displacement, E, of said inner gimbal about said platform axis to generate a first control signal proportional to:

$$e_x \cos E - e_z \sin E$$

c. means for detecting the angular displacement, M, of said outer gimbal about said middle gimbal axis, and associated first generating means for generating a second control signal proportional to:

$$\sin M$$

d. a middle axis motor and associated control circuit, said middle axis motor and circuit being responsive to said first control signal to:
  i. displace said middle gimbal about said middle gimbal axis in a first direction, so as to null said first control signal when the current values of the I and M are in zones (1), (3), (5) and (6) of twelve predetermined I-M zones,
  ii. displace said middle gimbal about said middle gimbal axis in the other direction so as to null said first control signal when the current values of I and M are in zones (2), (4), (7) and (8) of said predetermined I-M zones,
said middle axis motor and circuit being responsive to said second control signal to:
  iii. displace said middle gimbal about said middle gimbal axis in a first direction so as to null said second control signal when the current values of I and M are in zones (9) and (10) of said predetermined I-M zones,
  iv. displace said middle gimbal about said middle gimbal axis in the other direction so as to null said second control signal when the current values of I and M are in zones (11) and (12) of said predetermined I-M zones,
iv. an outer axis control means including:
a. said X-gyro, said Z-gyro, and said resolver,
b. means for generating a selected angle signal, $E_c$,
c. second generating means responsive to said selected angle signal and to the angular displacement, E, of said inner gimbal about said platform axis, for generating a third control signal proportional to:

$$\sin (E - E_c)$$

d. means for detecting the angular displacement, I, of said middle gimbal about said inner gimbal axis, and associated generating means for generating a fourth control signal proportional to:

$$\sin I$$

e. an outer axis motor means and associated control circuit, said outer axis motor means and circuit being responsive to said first control signal to:
  i. displace said outer gimbal about said outer gimbal axis in a first direction so as to null said first control signal when the current values of I and M are in zones (9) and (12) of said predetermined I-M zones,
  ii. displace said outer gimbal about said outer gimbal axis in the other direction so as to null said first signal when the current values of I and M are in zones (10) and (11) of said predetermined I-M zones,
said outer axis motor and circuit being responsive to said third control signal to:
  i. displace said outer gimbal about said outer gimbal axis in a first direction so as to null said third control signal when the current values of I and M are in zones (1) and (4) of said predetermined I-M zones,
  ii. displace said outer gimbal about said outer gimbal axis in the other direction when the current values of I and M are in zones (2) and (3) of said predetermined I-M zones,
said outer axis motor and circuit being responsive to said fourth control signal to:
  i. displace said outer gimbal about said outer gimbal axis in a first direction so as to null said fourth control signal when the current values of I and M are in zones (5) and (7) of said predetermined I-M zones, and
  ii. displace said outer gimbal about said outer gimbal axis in the other direction so as to null said fourth control signal when the current values of I and M are in zones (6) and (8) of said predetermined I-M zones,
where said twelve predetermined I-M zones are defined to be:

| Zone (1): | $[-a + 2\pi m] < I < [+b + 2\pi m]$ radians<br>$[-q + 2\pi n] < M < [+r + 2\pi n]$ radians |
|---|---|
| Zone (2): | $[d + 2\pi m] < I < [-c + 2\pi(m + 1)]$ radians<br>$[-q + 2\pi n] < M < [+r + 2\pi n]$ radians |
| Zone (3): | $[-a + 2\pi m] < I < [+b + 2\pi m]$ radians<br>$[+t + 2\pi n] < M < [-s + 2\pi(n + 1)]$ radians |
| Zone (4): | $[+d + 2\pi m] < I < [-c + 2\pi(m + 1)]$ radians<br>$[+t + 2\pi n] < M < [-s + 2\pi(n + 1)]$ radians |
| Zone (5): | $[-a + 2\pi m] < I < [+b + 2\pi m]$ radians<br>$[+r + 2\pi n] < M < [+t + 2\pi n]$ radians |
| Zone (6): | $[-a + 2\pi m] < I < [+b + 2\pi m]$ radians<br>$[-s + 2\pi n] < M < [-q + 2\pi n]$ radians |
| Zone (7): | $[+d + 2\pi m] < I < [-c + 2\pi(m + 1)]$ radians<br>$[+r + 2\pi n] < M < [+t + 2\pi n]$ radians |
| Zone (8): | $[+d + 2\pi m] < I < [-c + 2\pi(m + 1)]$ radians<br>$[-s + 2\pi n] < M < [-q + 2\pi n]$ radians |
| Zone (9): | $[-c + 2\pi m] < I < [-a + 2\pi m]$ radians<br>$[-q + 2\pi n] < M < [+r + 2\pi n]$ radians |
| Zone (10): | $[+b + 2\pi m] < I < [+d + 2\pi m]$ radians<br>$[-q + 2\pi n] < M < [+r + 2\pi n]$ radians |
| Zone (11): | $[-c + 2\pi m] < I < [-a + 2\pi m]$ radians<br>$[+t + 2\pi n] < M < [-s + 2\pi(n + 1)]$ radians |
| Zone (12): | $[+b + 2\pi m] < I < [+d + 2\pi m]$ radians<br>$[+t + 2\pi n] < M < [-s + 2\pi(n + 1)]$ radians | and $m$ and $n$ are integers, where $a$, $b$, $q$, and $r$ are greater than or equal to zero and less than $\pi/2$ radians, and, $c$, $d$, $s$, and $t$ are greater than $\pi/2$ radians and less than or equal to $\pi$ radians.

2. The system according to claim 1 wherein:
A. said first generating means further includes means for modifying said second control signal to be proportional to:

$$\sin M - K_2 (e_x \cos E - e_z \sin E) \cos I,$$

and
B. said second generating means further includes means for modifying said third control signal to be proportional to:

$$\sin(E - E_c) - K_1(e_x \cos E - e_z \sin E) \sin I,$$

where $K_1$ and $K_2$ are predetermined constants.

3. A system according to claim 1 wherein said selected angle signal generating means is operative when the current values of I and M are in one of zones (1)–(4), to generate said selected angle signal $E_c$ wherein $E_c$ is a constant equal to the value of the angular displacement E immediately preceding the entry of the values of I and M into said one of zones (1)–(4).

4. The system according to claim 1 wherein $a=b$, $c=d$, $q=r$ and $s=t$.

5. The system according to claim 4 wherein $a=q$ and $c=s$.

6. The system according to claim 5 wherein $a=\pi/4$ radians and $c=3\pi/4$ radians.

7. The system according to claim 2 wherein $a=b$, $c=d$, $q=r$ and $s=t$.

8. The system according to claim 7 wherein $a=q$ and $c=s$.

9. The system according to claim 8 wherein $a=\pi/4$ radians and $c=3\pi/4$ radians.

10. The system according to claim 3 wherein $a=b$, $c=d$, $q=r$ and $s=t$.

11. The system according to claim 10 wherein $a=q$ and $c=s$.

12. The system according to claim 11 wherein $a=\pi/4$ radians and $c=3\pi/4$ radians.

* * * * *